(No Model.) 6 Sheets—Sheet 1.

F. H. RICHARDS.
GRAIN METER.

No. 442,718. Patented Dec. 16, 1890.

Inventor:
Francis H. Richards

Witnesses:
WM. Bjorkman
H. L. Reckard (No Model.) 6 Sheets—Sheet 2.

F. H. RICHARDS.
GRAIN METER.

No. 442,718. Patented Dec. 16, 1890.

Inventor:
Francis H. Richards

Witnesses:
W. M. Bjorkman
H. L. Rickard (No Model.)  6 Sheets—Sheet 4.

F. H. RICHARDS.
GRAIN METER.

No. 442,718.  Patented Dec. 16, 1890.

Inventor:
Francis H. Richards

Witnesses:
W. M. Bjorkman
H. L. Reckard (No Model.)  F. H. RICHARDS.  6 Sheets—Sheet 5.
GRAIN METER.
No. 442,718.   Patented Dec. 16, 1890.
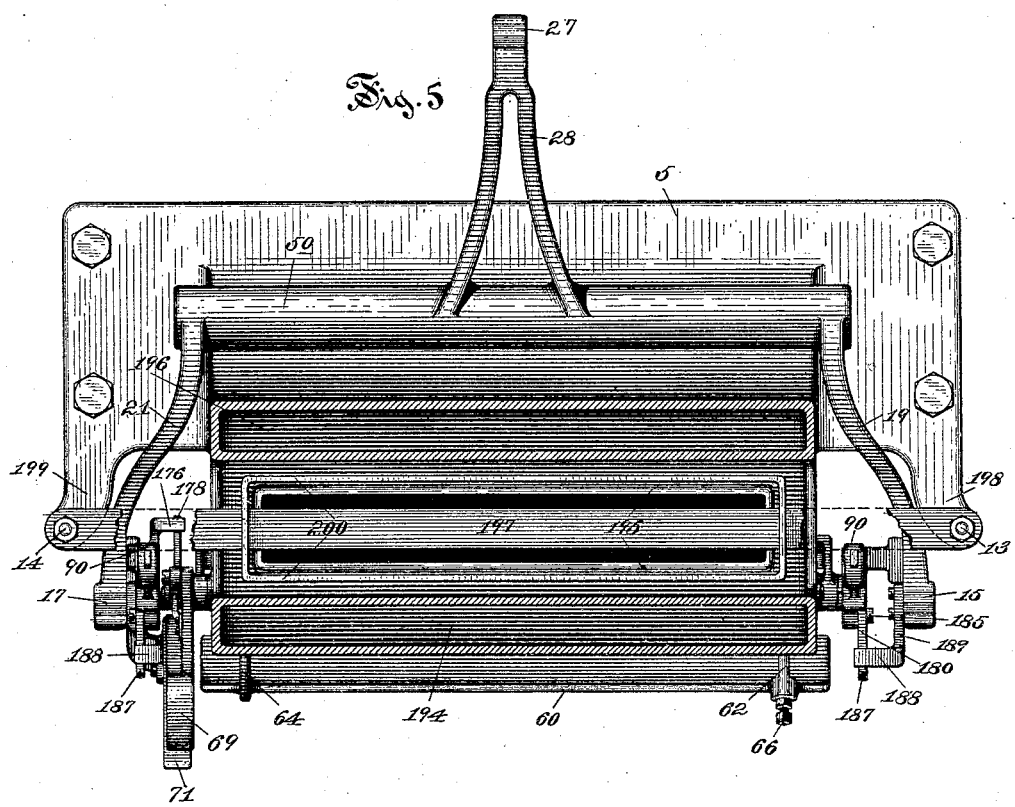

(No Model.) 6 Sheets—Sheet 6.

F. H. RICHARDS.
GRAIN METER.

No. 442,718. Patented Dec. 16, 1890.

Witnesses:
W. M. Bjorkman
Henry L. Reckard

Inventor:
Francis H. Richards

United States Patent Office.

FRANCIS H. RICHARDS, OF HARTFORD, CONNECTICUT, ASSIGNOR TO THE PRATT & WHITNEY COMPANY, OF SAME PLACE.

GRAIN-METER.

SPECIFICATION forming part of Letters Patent No. 442,718, dated December 16, 1890.

Application filed March 4, 1890. Serial No. 342,657. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Grain-Weighers, of which the following is a specification.

This invention relates to automatic grain-weighers of the class having a multiplicity of valves actuated by the scale-beam, the object being to provide a sensitive and accurately-operating valve mechanism and other features hereinafter more fully set forth.

Figure 1:
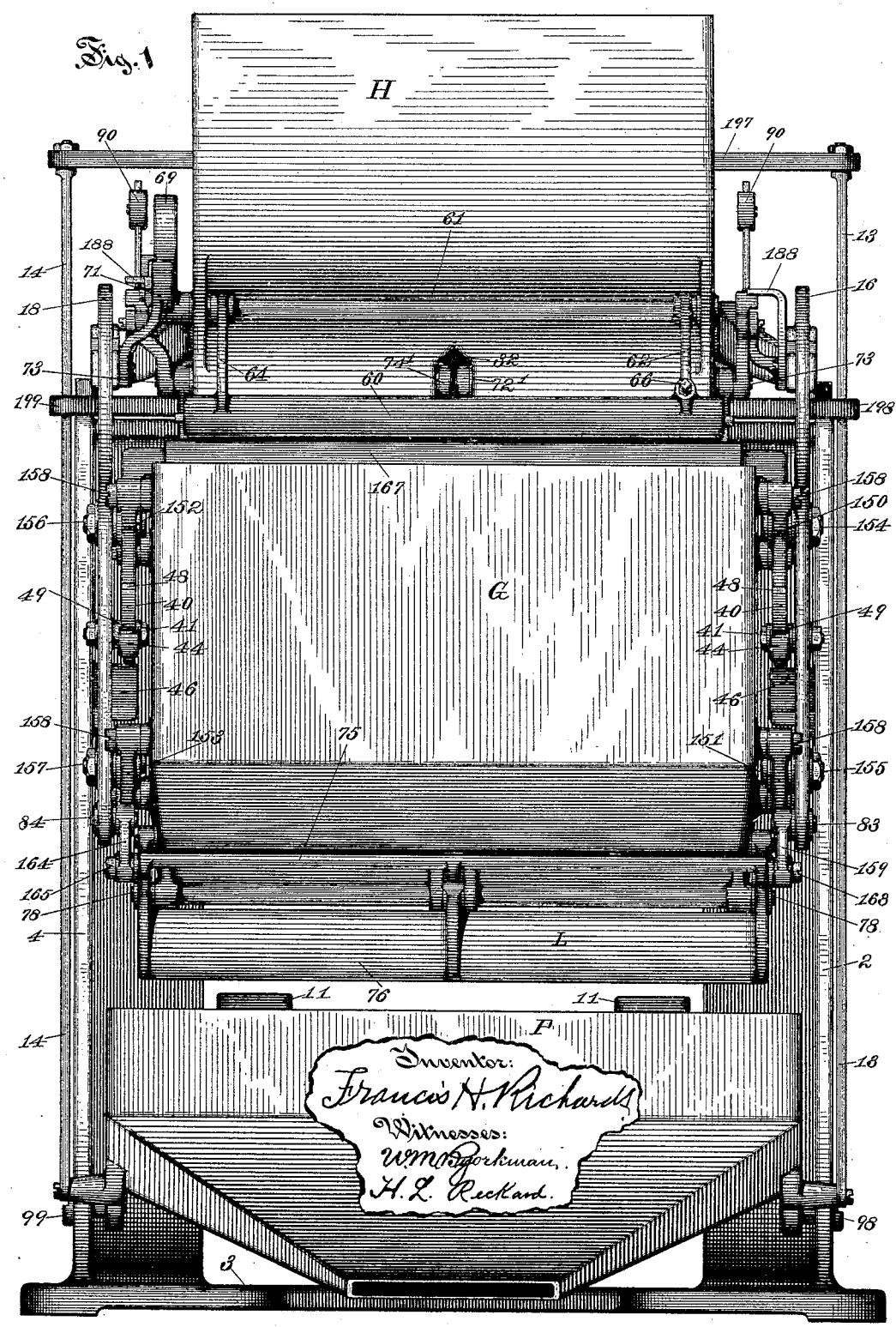
Figure 2:
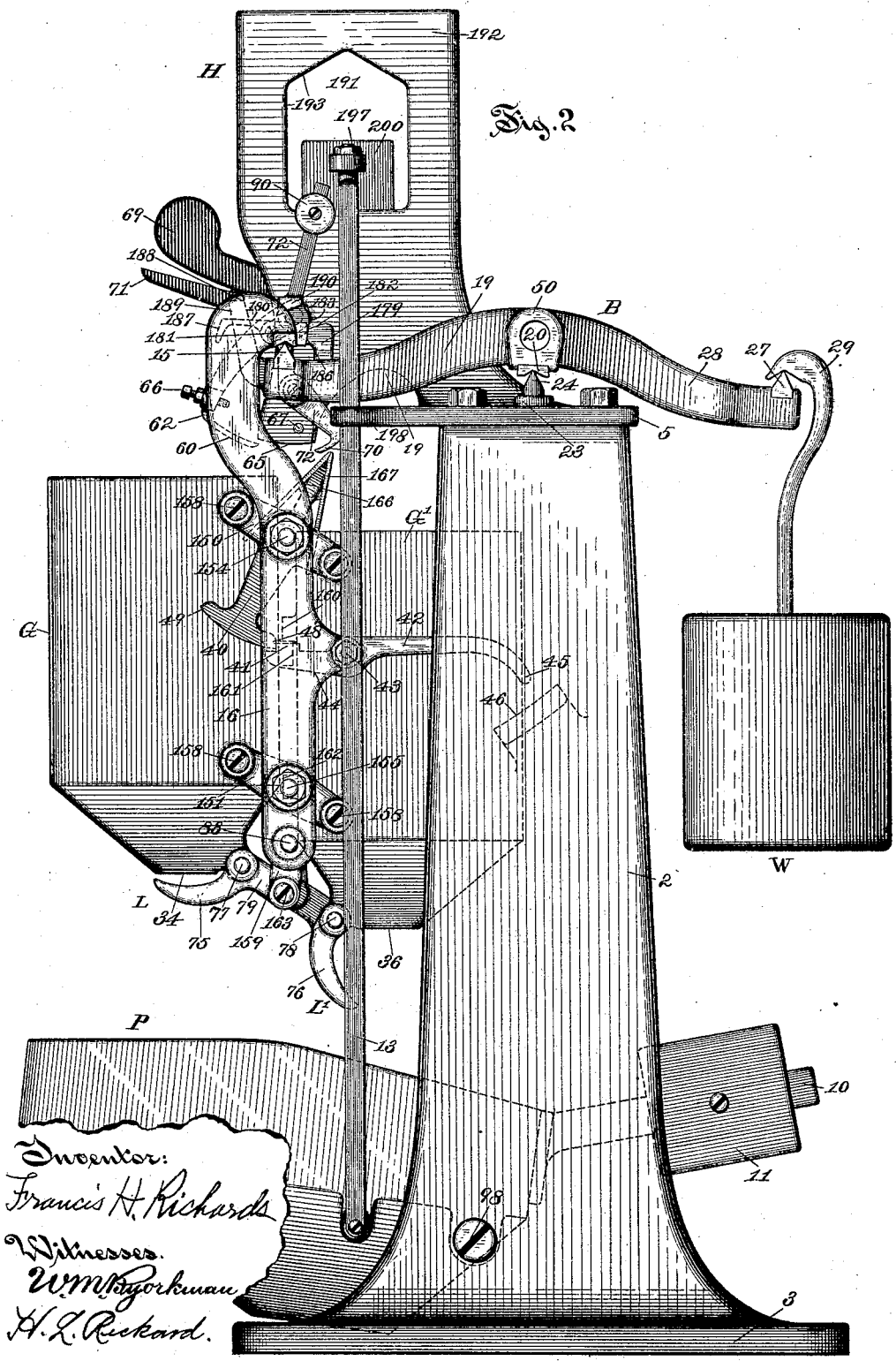
Figure 3:
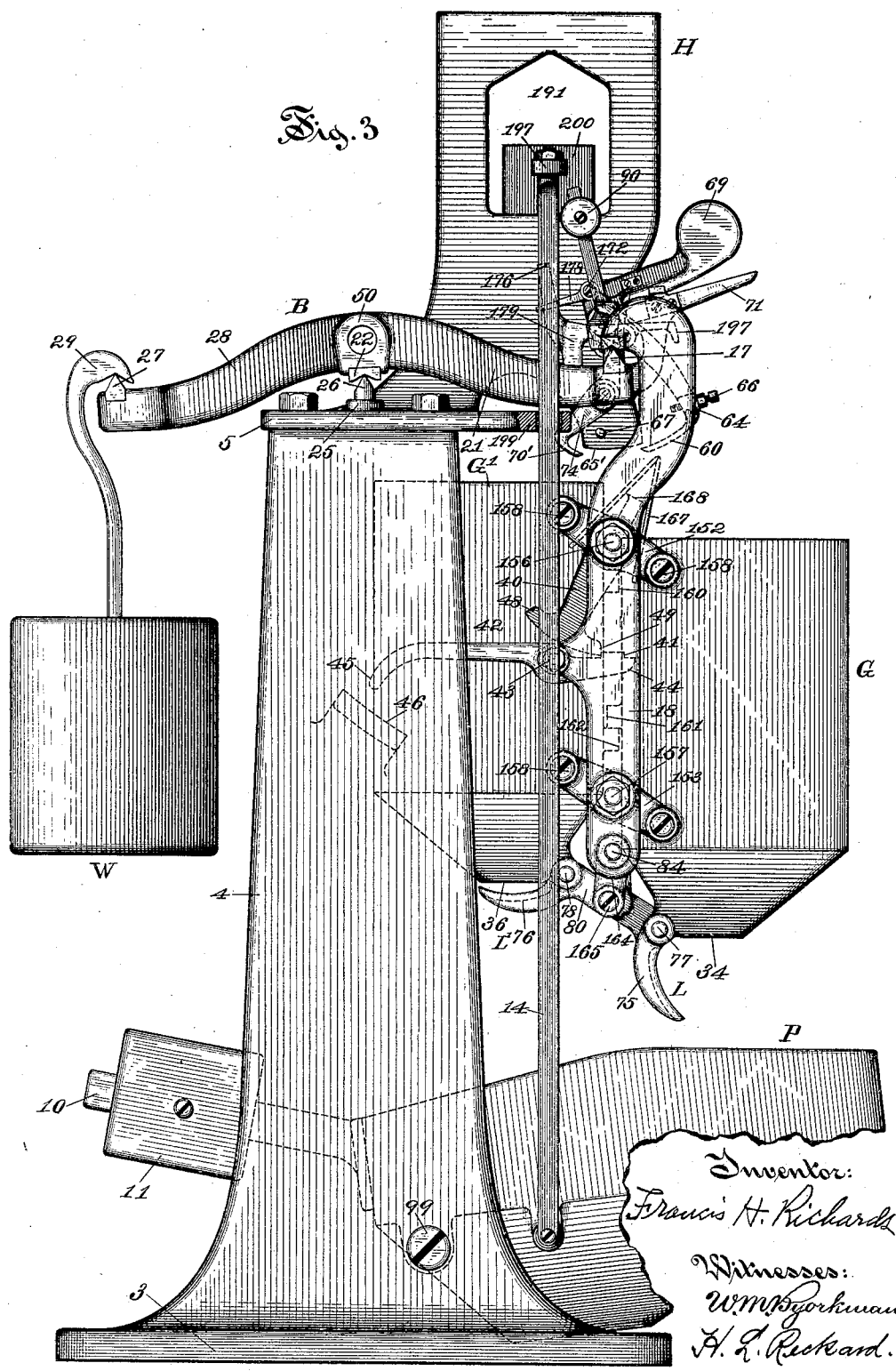
Figure 4:
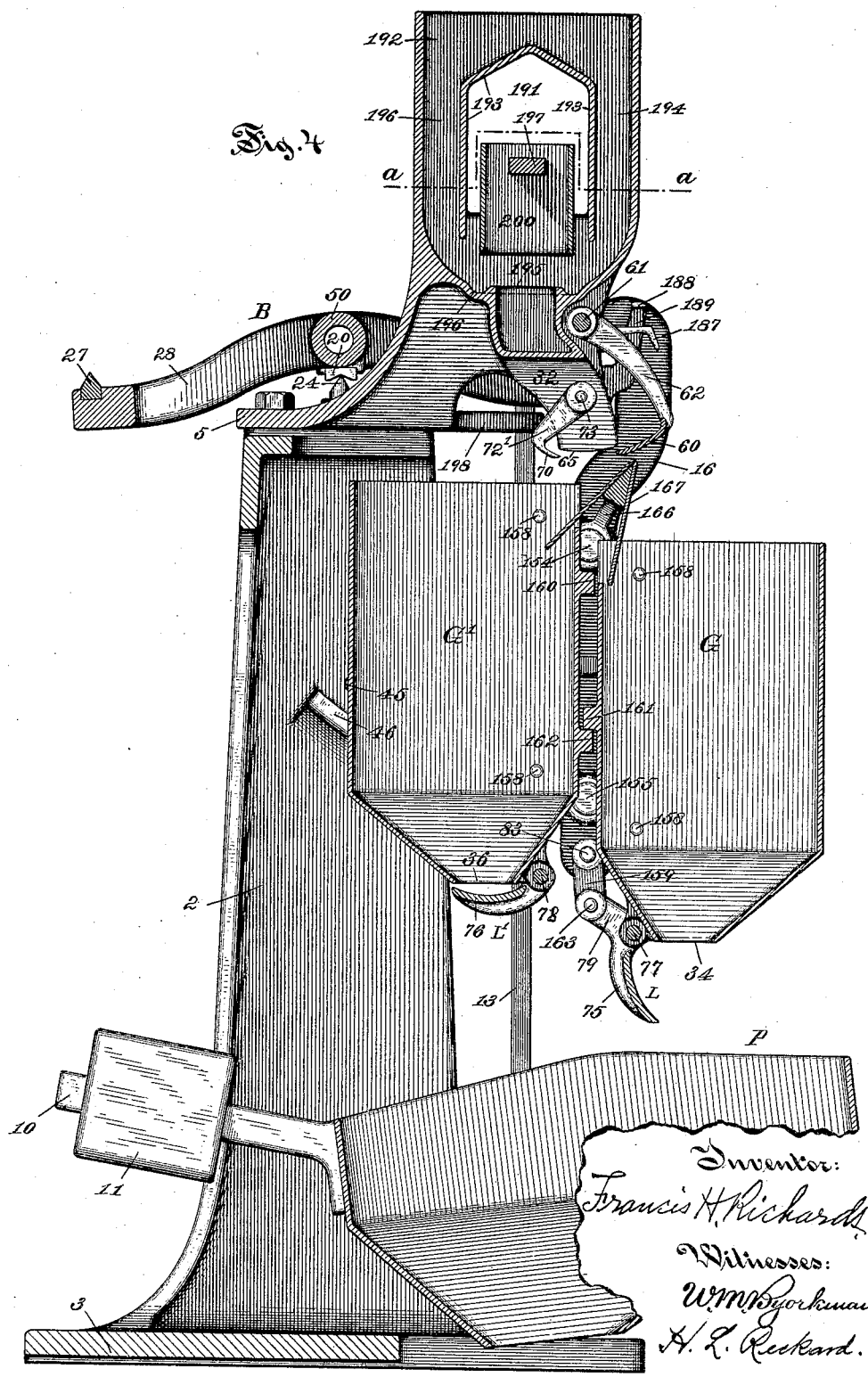
Figure 7:
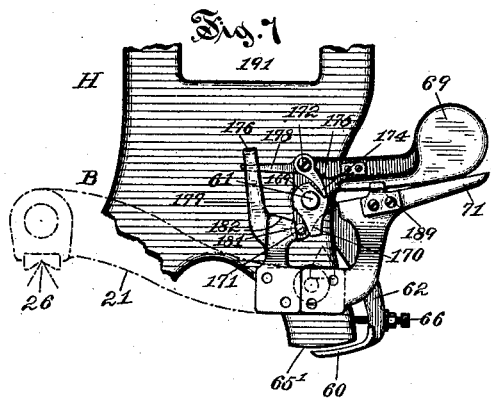
Figure 9:
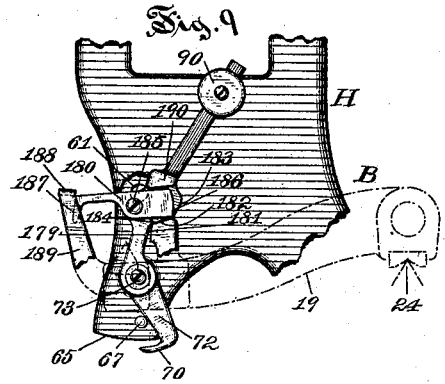
Figure 8:
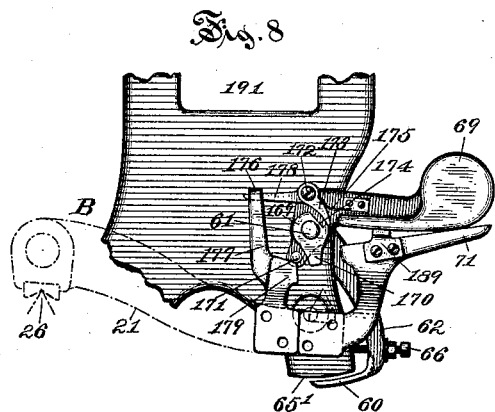
Figure 10:
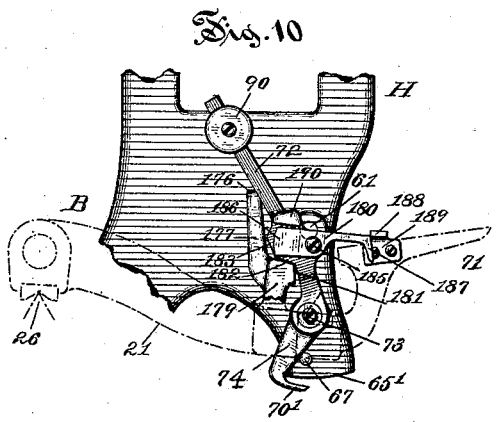

In the drawings accompanying and forming a part of this specification, Figure 1 is a front elevation of an automatic grain-weigher embodying my present improvements. Fig. 2 is a side elevation of the machine, as seen from the right hand of Fig. 1. Fig. 3 is a similar view of the left-hand side of the machine. Fig. 4 is a central transverse vertical section of the machine. Fig. 5 is a horizontal sectional view in line $a\ a$ of Fig. 4, showing the parts below said line that are supported by the top plate. Fig. 6 is a detached view of the weighted valve-lever 69, as seen from the rear of the machine. Figs. 7 and 8 show a part of the supply-chute with certain portions of the valve mechanism, and illustrate their operation by showing the parts in successive positions, all as seen from the left hand in Fig. 1. Figs. 9 and 10 are similar views showing a part of the supply-chute with the cut-off-valve mechanisms, all as seen from the right hand in Fig. 1. Figs. 11, 12, 13, and 14 show by progressive steps the reducing of the flow of grain to a "drip" and the mode of cutting off of the drip.

Similar characters designate like parts in all the figures.

The frame-work for carrying the operative parts of this machine usually, and as shown in the drawings, comprises two side frames or uprights 2 and 4, held together by the top plate 5, carrying the supply-chute H, and by the bottom plate 3, herein shown formed integral with the side frames; or the side frames may be separate and held together by suitable tie-rods and braces, as shown in prior Letters Patent to C. H. Cooley.

The grain-buckets G and G' are suspended under the chute H and alternately receive and discharge their loads of grain. The construction of the grain-buckets is well illustrated in Figs. 1, 2, 3, and 4. The said buckets are or may be formed of thin sheet metal, and are supported by the arms or levers 150, 152, 151, and 153, which are centrally pivoted at 154, 156, 155, and 157 to the hangers 16 and 18. The pivot-screws 158 pass freely through said arms and are screwed firmly into the side walls of the buckets, pivotally connecting said buckets to said arms. The said hangers 16 and 18 are suspended by V-shaped bearings on the pivots or knife-edges 15 and 17, respectively, of the principal arms 19 and 21 of the scale-beam B. This beam has V-shaped bearings 20 and 22, one at each end of the hollow shaft 50 thereof, which rest on the pivots or knife-edges 24 and 36, that are suitably supported, as by bearings 23 and 25, on the frame-work. Opposite to arms 19 and 21 an arm 28 extends rearwardly of the scale-beam shaft 50, and is provided with a pivot or knife-edge 27, on which the main weight W (also designated as the "counter-weight") is suspended by a hook 29. In this my improved machine I use a pair of single-chambered buckets in place of the double-chambered oscillating bucket now generally employed in practice in this art. The said pair of buckets have a vertical movement relatively to the hangers and to each other. The rear bucket G' has two lugs or stops 160 and 162 and the forward bucket G has one similar lug or stop 161. These stops are or may be formed on or fixed to the adjacent inner walls of the said buckets, being provided for the purpose of limiting the rise and fall thereof. The bucket-closers are designated in a general way by L and L', respectively. The cup-shaped closer-plate 75, or "closer" proper, is supported on the pivot rod or shaft 77, which is journaled in suitable bearings formed on the bucket G and closes under the outlet 34 of said bucket. A similarly-formed closer 76 is supported on another and similar pivot-rod 78, journaled in bearings formed on the bucket G' and closes under the outlet 36 thereof. The closer 75 is operated by the hanger 16 through the link 159, which is pivoted at 83 to said hanger and at 163 to the arm 79 of said closer 75. The closer 76 is operated by the hanger 18 through the link 164, which is pivoted at 84 to said hanger and at 165 to the arm 80 of said closer 76. By these means the descent of the bucket relatively to the hangers operates to open the closer thereof, as clearly indicated in the drawings.

An arm 166 is formed integral with the bucket-supporting lever 150 and another and similar arm 168 is formed integral with the bucket-supporting lever 152. These arms have fixed to their upper ends the deflector 167, connecting said arms. The office of said deflector is to govern the course of the falling column of grain, guiding said column into the forward bucket G or into the rear bucket G', as the case may be.

In practice, and especially in large-sized machines, two sets of bucket-detent apparatus are used, the operative parts thereof being symmetrically arranged in pairs—one set on either side of the grain-buckets. The said parts being alike in form, construction, and operation, a description of one set will suffice for the proper understanding of said apparatuses. The detent latch or lever 42 is pivoted at 43 to the hanger 16, and is operated by the latch-bracket 46 in a well-known manner. A short arm 44 of said lever 42 has a catch 41 formed thereon. A detent-arm 40 is here shown formed integral with the bucket-supporting lever 150 and having the opposite catches 48 and 49 to alternately engage the catch 41.

The operation of the bucket mechanism above described is as follows: Suppose the parts to be in the positions shown in Fig. 2. The grain flowing from the outlet 65 of the supply-chute H strikes the forward side of the deflector 167 and is guided thereby into the forward bucket G. When the major part of a load has been deposited in said bucket, the beam descends to the poising-point and the reducing-valve reduces the flow of grain to a drip, by which the final load is made up, which being done the beam further descends below the poising-point, whereby the flow of grain is entirely cut off by the closing of the cut-off valve, and the lever 42, striking the abutment 46, operates to disengage the catch 41 from the end 48 of the detent-arm 40. The loaded bucket G now quickly falls and the empty bucket G' is raised, thus opening the closer 75 and discharging the load of grain into the hopper P, the closer 76 at the same time being closed under the outlet 36 of the bucket G', as in Fig. 3. The fall of the bucket also throws the deflector 167 from its position in Fig. 2 to its position in Fig. 3, thus locking the bucket G' in its uppermost position. When the load is discharged from the bucket G, as above described, the beam rises, opening the valves and allowing the grain to again flow freely from the supply-chute H. The column of grain now strikes the rear side of the deflector, and is thereby guided into the rear bucket G'. On the full fall of the bucket G, and as soon as the deflector has been thrown fully over, the end 49 of the detent-arm 40 engages with the catch 41 and the buckets and accessory parts are locked in the position shown in Fig. 3. In Fig. 2 the stop or lug 161 of the bucket G is shown in engagement with the similar stop 160 of the bucket G', and in Fig. 3 the said stop 161 is in engagement with the stop 162 of the said bucket G', the office of the said stops being to take the blow and limit the fall of the grain-buckets.

The valve mechanism for reducing and for cutting off the flow of grain to the buckets is actuated from and by the scale-beam. The reducing-valve 60 is carried by the arms 62 and 64, that are carried by the pivot-shaft 61, said valve being furnished with a suitable stop, sometimes made adjustable, as the stop 66, to regulate or limit its closing movement. This valve 60 closes under the outlet 65 of the chute H somewhat more than half of the width thereof. The valve is actuated by the valve-lever 69 from the valve-actuating arm 71 of the beam B. The arm 71 is here shown fixed to the arm 21 of the beam by means of screws; but said arms may be formed integral if such construction be preferred.

The construction and operation of the reducing-valve-actuating device will be best understood from Figs. 7 and 8. The weighted valve-lever 69 is carried by the pivot-shaft 61, it being fitted to turn freely thereon. A "dog" or catch 169 is pinned or otherwise made fast to the pivot-shaft 61. A pin or stop 171, fixed in the arm 69, is provided to engage the arm 170 of the catch 169. A pawl 173, pivoted at 172 to the arm 69, is held in engagement with the notch 174, that is formed in the dog or collar 169 by a spring 175. On the descent of the beam to the poising-point the reducing-valve 60 is gradually closed under the outlet 65 of the chute until the stop 66 strikes said chute and limits the further closing of said valve, and also the further turning of the shaft 61. The dog 169 being fixed to said shaft 61 and the pawl 173 being in engagement with the notch 174 of said dog, a further lowering of the valve-lever 69 is checked. On the final lowering of the scale-beam, which takes place on the completion of the full load, the hook-shaped end 176 of the arm 177 (fixed or formed on the scale-beam) engages with the arm 178 of the said detent-pawl 173 and operates to throw said pawl out of the notch 174, as in Fig. 8. When thus released, the weighted lever 69, being free to turn on the shaft 61, falls on the beam-arm 71, thus adding the weight of said lever to that of the descending loaded bucket, and thereby effectively operating the bucket-closers and the deflector. On the rising of the beam the beam-arm 71 raises the valve-arm 69, and the pin 171 in said arm 69, coming in contact with the arm 170 of the dog 169, turns the pivot-shaft 61, and thereby opens the reducing-valve 60, the pawl 173 at the same time re-engaging the notch of the dog 169, as shown in Fig. 7.

In this improved machine I use two cut-off valves 70 and 70'. These valves are substantially alike in form, construction, and mode of operation, but are regulated or timed to close under the outlets 65 and 65', respectively, of the chute H, one a little in advance of the other, thus reducing the drip to a minimum shortly before the final cutting off of the same. A description of one of the cut-off valves will therefore be sufficient for the proper understanding of both. The cut-off valve 70 is carried by the arms 72 and 72', pivoted at 73 to the supply-chute H. A stop-pin 67 is provided, if desired, to limit its closing movement. The arm 72 is continued above the pivot 73 and has the catch 180 and some suitable weight, as 90. The construction and mode of operation of the cut-off valves, respectively, are shown more fully in the views Figs. 9 and 10. A cam-shaped part or arm 179, having the cam-faces 181 and 182 formed thereon, is fixed to or formed on the arm 19 of the scale-beam. The arm 72 of the valve 70 has two cam-faces 183 and 184 to engage the cam-faces of the part 179. The cam-latch 180 is pivoted at 185 to the valve-arm 72. The face 186 of the rear end of said latch engages with the cam-faces of the arm or part 179. The outer end 187 of said latch engages at the proper time the hook-shaped end 188 of the arm 189, that is carried on the scale-beam. A stop or projection 190 is formed on the arm 72 to limit the movement of the latch 180 on its pivot 185. In Fig. 9 the beam is down, while in Fig. 2 it is up. In the latter figure the latch-face 186 forms a lower continuation of the cam-face 183 of the valve-arm 72. On the downward movement of the beam the face 181 slides down against the faces 183 and 186 until (after the poising) the hook 188 strikes the latch 180 on the arm 187 thereof and suddenly throws the face 186 upward, thus allowing the valve to close, as indicated in Fig. 10, suddenly and fully. The upper face 182 of the valve-actuating cam is set inclined, substantially as shown, so that on the upward movement of the beam said cam may easily open the valve. The valve being opened the latch 180 again resumes its normal or working position, as shown in Fig. 2. This description applies equally to both said valves 70 and 70', it being understood these are similar but oppositely disposed, so that their actuating devices are arranged as "rights" and "lefts," as indicated by Figs. 9 and 10, respectively.

The supply-chute H is shown of a form and construction suitable for using the regulator which is described and claimed in my application, Serial No. 344,717, filed March 21, 1890, to which reference may be had for a particular description of the construction and operation thereof. In this application the parts P, 10, 11, 13, 14, 98, 99, 197, 198, 199, and 200 are the same as designated by said characters in said application Serial No. 344,717. The supply-chute H, as shown in Figs. 2, 3, and 4, is formed integral with the top plate 5 of the frame-work. The upper portion of said chute has the openings 191 formed in the end walls 192 thereof, said opening being surrounded at top and at the two sides thereof by the walls 193. The said walls 193 extend from side to side longitudinally of the chute, connecting the said end walls 192 of said chute and dividing the said chute centrally and forming the side passages 194 and 196. A rim or flange 195 is formed around the top of the outlet of the chute, and a groove or depression 197 is formed in the chute around said flange. The lower portion of the outlet of the chute is divided into two parts, forming the separate outlets 65 and 65' for the two valves 70 and 70', respectively. This construction provides a space at 32, Figs. 1 and 4, for the arms 72' and 74' of said cut-off valves, respectively.

Figure 11:
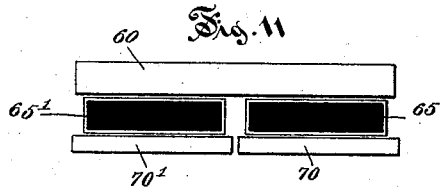
Figure 12:
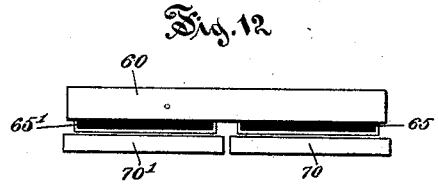
Figure 13:
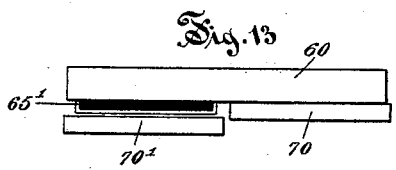
Figure 14:
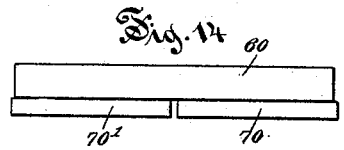

The successive closing movements of the valves are shown in Figs. 11 to 14, inclusive. In Fig. 11 all three valves are open. In Fig. 12 the reducing-valve 60 is closed. In Fig. 13 the reducing and the first cut-off valves are closed. In Fig. 14 all three are closed. The object of this "triple cut-off" is to assist in reducing the momentum of the descending load to a minimum at the close of the poising, so as to increase the accuracy of the weighing to a maximum.

The general operation of the machine is as follows: The machine standing, as in Figs. 1 and 2, with all the valves open, the grain is discharged from both spouts 65 and 65' into the bucket G. When this bucket is sufficiently loaded, the beam descends about one-half its stroke and closes the valve 60, as in Fig. 12. The drip now continues to flow from both said spouts until the beam again starts downward, when the hook 188 strikes the latch 180, Fig. 9, and instantly closes the valve 70, as shown in Figs. 9 and 13, but without throwing the weight of said valve on the beam. Next the drip flows from spout 65', as indicated in Fig. 13, until the beam again starts downward, when the hook 188, Fig. 10, strikes the other latch 180 and closes the second cut-off valve 70', as shown in Figs. 10 and 14. Simultaneously with the last-described valve closure, the hook 176 strikes the arm 178 of pawl 173, Fig. 8, and thus unlocks the lever 69, which then falls onto the beam-arm 71 and drives down the bucket to unlock the bucket-catches and discharge the load, as hereinbefore described. This operation by the descent of the loaded bucket elevates the bucket G' and shifts the deflector, as in Figs. 3 and 4, and the load being discharged the beam rises and opens all the valves for repeating the above-described operations.

When reference is herein made to the movement of the "scale-beam," the movement of the bucket-supporting arms thereof is meant, this coinciding, of course, with the bucket itself.

Having thus described my invention, I claim—

1. In a grain-weigher, the combination, with the scale-beam, of bucket-carrying hangers suspended from one end of said beam, two connected buckets, carried one on either side of said hangers and having rising and falling movements relatively to the hangers, and a deflector carried on the hangers and operatively connected to be shifted on the movement of the buckets relatively to each other, whereby to direct the grain into the elevated bucket.

2. In a grain-weigher, the combination, with the scale-beam, of bucket-carrying hangers suspended from one end of said beam, two connected buckets, carried one on either side of said hangers and having rising and falling movements relatively to the hangers, bucket-closers, one on and for each bucket, said closers being operatively connnected, substantially as described, with the hangers to close the uppermost and open the lowermost bucket.

3. In a grain-weigher, the combination, with the scale-beam, of bucket-carrying hangers suspended from one end of said beam, two connected buckets, carried one on either side of said hangers and having rising and falling movements relatively to the hangers, the deflector carried on the hangers, the bucket-closers, one on and for each bucket, and connections, substantially as described, with the hangers and buckets, shifting the deflector in the direction of the opening bucket-closer.

4. In a grain-weigher, the combination, with the scale-beam, of bucket-carrying hangers suspended from one end of said beam, two connected buckets, carried one on either side of said hangers and having rising and falling movements relatively to the hangers, the closers, one on and for each bucket, connections, substantially as described, operating said closers from the hangers on the movement of the buckets relatively to the hangers, and stops limiting the bucket movements.

5. In a grain-weigher, the combination, with the scale-beam, of bucket-carrying hangers suspended from one end of said beam, the two connected buckets, carried one on either side of said hangers, the deflector, the closers, connections, substantially as described, operating said deflector and closers, and stops limiting the bucket movement.

6. In a grain-weigher, the combination, with the scale-beam and hangers, of the bucket-carrying levers, the buckets, stops limiting the bucket movement, the detent-arm extending from one said lever, and the detent-lever engaging said arm.

7. In a grain-weigher, the combination, with the bucket-carrying hangers suspended from the scale-beam, and with a pair of grain-buckets oppositely disposed and carried, respectively, on the opposite ends of levers pivotally supported in said hangers, of the detent-arm 40, projecting from one said lever, the lever 42, pivotally supported on the hanger and engaging said arm 40, and a bracket fixed on the frame-work of the machine and located for disengaging said lever from said detent-arm on the descending movement of the hanger and buckets.

8. In a grain-weigher, the combination, with the supply-chute and the scale-beam, of the reducing-valve and the two cut-off valves, and valve-actuating mechanism operating on the descent of the scale-beam to close first the reducing-valve and then the cut-off valves in succession.

9. In a grain-weigher, the combination, with the supply-chute divided by the middle space 32, of the two cut-off valves having arms pivoted in said space.

10. In a grain-weigher, the combination, with the supply-chute and the scale-beam, of the reducing-valve, the dog fixed thereon, the valve-lever, the pawl on said lever for engaging said dog, and means disengaging the pawl on the descent of the beam below the poising-point.

11. In a grain-weigher, the combination, with the supply-chute and the scale-beam, of the reducing-valve, the valve-lever, the dog, the pawl, the arm 178 on said pawl, the hook on the beam engaging said arm 178, and the stop 171.

12. In a grain-weigher, the combination, with the supply-chute and the scale-beam, of the cut-off valve having the cam-arm and the latch on said arm, a cam-face on the beam for operating said valve, and means operating to shift the latch on the descent of the beam below a given point.

13. In a grain-weigher, the combination, with the supply-chute and the scale-beam, of the cut-off valve having the cam-arm, the latch 180, carried by said arm, a cam on the beam operating said cam-arm, the stop 190 on the cam-arm, and a hook on the beam engaging the latch.

FRANCIS H. RICHARDS.

Witnesses:
HENRY L. RECKARD,
W. M. BYORKMAN.